Sept. 17, 1935.    H. P. PHILLIPS    2,014,812
PISTON RING END CUTTING MACHINE
Filed Feb. 16, 1934
Fig. 1.
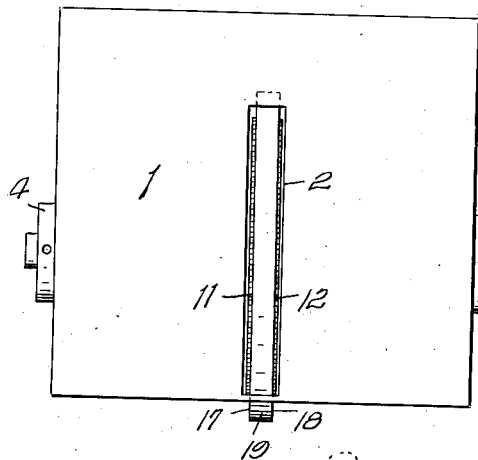
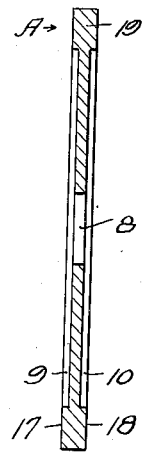
Fig. 2.    Fig. 3.
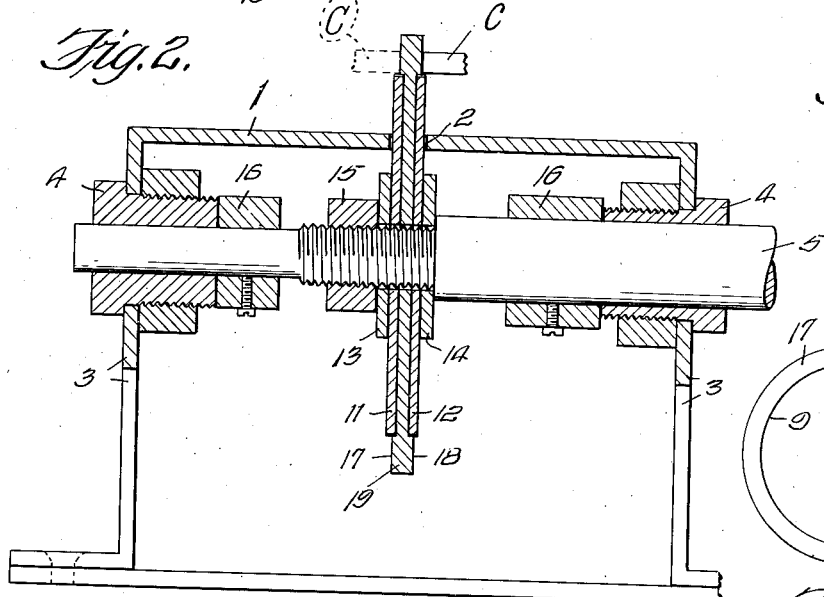
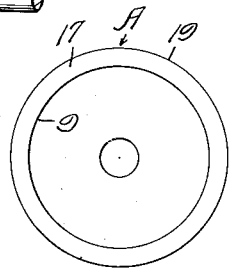
Fig. 4.
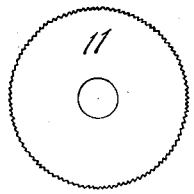
Fig. 5.
Fig. 6.
Fig. 7.
Fig. 8.
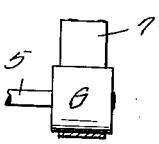
Fig. 9.
Fig. 10.
INVENTOR:
Harold P. Phillips.
BY
ATTORNEY.

Patented Sept. 17, 1935

2,014,812

UNITED STATES PATENT OFFICE 2,014,812

PISTON RING END CUTTING MACHINE

Harold P. Phillips, Maplewood, Mo., assignor to Climax, Jones & Quinn Company, St. Louis, Mo.

Application February 16, 1934, Serial No. 711,523

7 Claims. (Cl. 29—70)

This invention relates to piston ring end cutting machines.

The primary object of the invention is to provide a machine whereby one or both ends of a split piston ring can be cut off to reduce the diameter of the ring to the desired operative dimension.

A further object of the invention is the provision of a device having one or more cutters, and, a guide adjacent thereto against which one or both ends of a split piston ring can be slidably held for guided movement toward the cutter, or cutters.

A further object of the invention is the provision of a saw and ring guide equipped machine whereby predetermined amounts of metal can be sawed off of one or both ends of split piston rings, whether they be step cut rings, mitre cut rings, or butt joint or square end rings.

A still further object of the invention is the provision of a piston ring end cutting machine which possesses advantages in points of simplicity and efficiency, and, at the same time proves itself comparatively inexpensive in cost of manufacture.

With the above and other objects in view, the invention consists of the features of construction, the parts and combination thereof, and the mode of application, or their equivalent, as hereinafter described and finally pointed out in the claims hereto appended.

Reference will now be had to the drawing, wherein:—

Fig. 1 is a top plan view of a machine embodying the features of my invention.

Fig. 2 is a vertical sectional view of the machine.

Fig. 3 is a sectional view of the cutter holder and ring end guide.

Fig. 4 is a side elevation of the cutter holder and ring end guide.

Fig. 5 is a side elevation of one of the cutters.

Fig. 6 is a fragmentary view of a butt joint ring.

Fig. 7 is a fragmentary view of a step cut ring.

Fig. 8 is a fragmentary view of a mitre cut ring.

Fig. 9 is a modification of the shaft driving means.

Fig. 10 is a further modification of the shaft driving means.

Referring to the drawing, the table, or plate 1 having a slotted opening 2, and the legs 3, constitute the framework of the machine.

A pair of suitable bearings 4 are suitably secured to the frame of the machine below the table, or plate 1 thereof.

A suitable shaft 5 is journaled in the bearings 4. The shaft projects beyond one of the bearings and is suitably connected to an electric motor, or equivalent means for driving the shaft 5, such for instance as a pulley 6 on the shaft 5 driven by means of a belt 7, as shown in Fig. 9. The shaft could, if desired, also be driven by means of a crank, as shown in Fig. 10.

A suitable circular plate designated generally as A and having a suitable central opening 8 encircles the shaft 5 and is disposed so as to partially pass upwardly through the slotted opening 2 in the table or plate 1. The circular plate A has its side faces provided with annular recesses designated 9 and 10. These recesses are of different depths and are adapted to receive suitable cutters, such for instance as disc saws, designated 11 and 12, each having a central opening through which the shaft 5 passes.

The cutters are held in their positions relative to the recessed plate A by means of suitable clamp washers 13 and 14, or equivalent devices, and a nut 15 having screw threaded engagement with the shaft 5. The shaft 5 is provided adjacent each bearing 4 with a collar 16 which can be adjusted toward, or away from the inner faces of the bearings and serves as means to control the end thrust of the shaft 5.

It will be observed that the saws or cutters 11 and 12 project beyond the side faces 17 and 18 of the rim portion 19 of the plate A a predetermined distance to expose the teeth of the cutters, and, that the side faces of the rim 19 of the plate A serve as guides against which the ends of a piston ring are held against to gauge the width of cuts to be taken off of the ends of the ring to reduce the diameter of the ring to a predetermined dimension.

The cutting width of each cutter is different so that one cutter will cut off a greater amount of material from the end of a piston ring than the other, and, it will be apparent the saws can be reversed when the teeth exposed for use are worn or become dull, thus adding to the life of each cutter.

It will be apparent that both ends of a butt joint ring, or a step cut ring can be cut off simultaneously, or if desired, only one end need be cut off at a time. In a mitre cut ring, each end is preferably cut off independently of the other. However, it may only be necessary to cut off one end of a ring, and, in such instance, it can be readily accomplished by either cutter to reduce the diameter of the ring to a predetermined dimension.

In holding the end of a split piston ring against either guide surface and moving the ring end toward the cutter associated therewith, it will be observed that only a predetermined amount of material at the end of the ring so positioned can be removed, as the guide surfaces serve as gauges to control the amount of material to be cut from either end of the ring.

In actual practice, however, only one end of a butt joint ring C and a mitre cut ring D need be cut off to reduce its diameter, whereas with a step cut ring E each end thereof is cut off, but preferably only one end at a time.

The many advantages of the herein described invention will readily suggest themselves to those skilled in the art to which it appertains.

While in order to comply with the statute, the invention has been described in language more or less specific as to structural features, it is to be understood that the invention is not intended to be limited to the specific details shown, but that the means and construction herein disclosed comprises the preferred form of several modes of putting the invention into effect, and the invention is, therefore, claimed in any of its forms of modifications within the legitimate and valid scope of the appended claims.

What I claim is:

1. A ring end cutting machine having, in combination, a leg supported table, bearings on the legs of the table, a shaft journaled in the bearings, said shaft being of three diameters and one diameter thereof being screw threaded, a circular plate having a central opening and encircling the screw threaded diameter of the shaft, the side faces of the plate having recesses therein, disc saws seated in the plate recesses and projecting predetermined distances beyond the non-recessed side faces of the plate to expose the teeth of the saws, means for locking the saws in engagement with the recessed sides of the plate and against rotation relative to the plate and the plate relative to the shaft; the non-recessed side faces of the plates encircling portions of the saws serving as guides for the ends of a split piston ring to be held against when moving same into the saw teeth for cutting a selected end of the ring to reduce the diameter thereof to a predetermined dimension.

2. A piston ring end cutting machine having, in combination, a table having a slot in the top thereof, a shaft rotatably mounted below the top of the table, said shaft being of three diameters, screw threads on one diameter of the shaft, a disc held in fixed relation to the shaft on the screw threaded diameter thereof and having circular recessed side faces to provide a disc rim serving to provide opposed guide faces against which a selected end of a piston ring, to be cut off, is adapted to be placed for manual guided movement toward a selected disc saw, of which there are two held on the recessed sides of said disc against rotary displacement relative to each other and said disc and disc saws projecting upwardly through the slot in the table top.

3. In a machine of the class described, a rotatable shaft, supporting means for the shaft, a disk-like member, circular recesses formed in the side faces of said member to provide annular gage-faces, circular saws seated on and supported by the recessed faces of said member with only portions of the cutting edges of the saws exposed for use beyond the gage-faces and means for locking the disk-like member and the saws together to rotate as a unit with the shaft.

4. In a machine of the class described, a rotatable shaft, supporting means for the shaft, a disk-like member, circular recesses formed in the side faces of said member to provide annular gage-faces beyond the recesses, circular saws seated on and supported by the recessed faces of said member with only portions of the cutting edges of the saws exposed for use beyond the gage-faces, means for clamping the disk-like member and the saws together to rotate as a unit with the shaft, and said saws being reversible relative to the disk-like member so that the former unexposed cutting edge portions of the saws can be used when the previously exposed cutting edge portions of the saws become dull.

5. A machine for resizing piston rings having, in combination, a stationary table having a slot therein, a rotatable shaft, supporting means for the shaft, a disk-like member projecting upwardly through the slot in the table, circular recesses formed in the side faces of the disk-like member to provide gage-faces on the disk-like member beyond the circular recesses formed in the side faces thereof, circular saws seated in the recesses and in facial contact with the side faces of the disk-like member with predetermined portions of the cutting edges of the saws projecting beyond the gage-faces and means for clamping the disk-like member and the saws together as a unit to rotate with the shaft.

6. A machine for resizing piston rings having, in combination, a stationary table having a slot therein, a rotatable shaft, supporting means for the shaft, a disk-like member projecting upwardly through the slot in the table, circular recesses formed in the side faces of the disk-like member to provide gage-faces on the disk-like member beyond the circular recesses formed in the side faces thereof, circular saws seated in the recesses and in facial contact with the side faces of the disk-like member with predetermined portions of the cutting edges of the saws projecting beyond the gage-faces, means for clamping the disk-like member and the saws together as a unit to rotate with the shaft, and said saws being reversible relative to the disk-like member so that the former unexposed cutting edge portions of the saws can be used when the previously exposed cutting edge portions of the saws become dull.

7. In a device for resizing piston rings by sawing off the ends thereof, a pair of circular saws, means disposed between the saws and providing means for permitting only a predetermined portion of the cutting edge of each saw for use, said saws being reversible relative to the means therebetween so that the unexposed edge portions of the saws can be exposed for use when the former exposed edge portions become dull and means for clamping the saws and the means therebetween together as a unit to rotate with a driven shaft.

HAROLD P. PHILLIPS.